Oct. 3, 1967   G. RYHINER ET AL   3,345,215
SEPARATOR FOR PRIMARY CELLS
Filed March 13, 1964
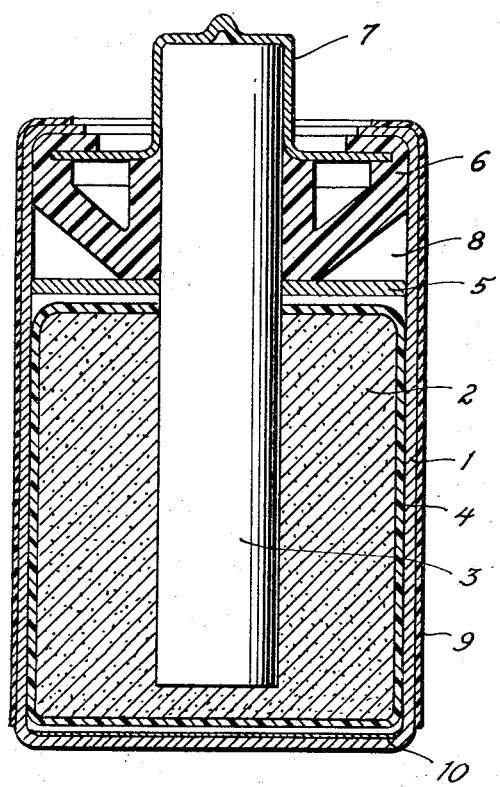
INVENTORS
ANITA RYHINER, EXECUTRIX
FOR GUENTHER RYHINER
ALFRED SCHMIER
BY
ATTORNEY.

3,345,215
SEPARATOR FOR PRIMARY CELLS
Guenther Ryhiner, deceased, late of Bad Soden, Taunus, Germany, by Anita Ryhiner, executrix, Bad Soden, Taunus, Germany, and Alfred Schmier, Frankfurt am Main, Germany, assignors to Varta Pertrix-Union Gesellschaft mit beschrankter Haftung, Ellwangen, Jagst, Germany, a corporation of Germany
Filed Mar. 13, 1964, Ser. No. 351,868
Claims priority, application Germany, Mar. 16, 1963, V 23,811
6 Claims. (Cl. 136—146)

The present invention relates to separators for primary batteries, and more particularly to organic polyelectrolyte separators containing metal cations.

Presently used primary cells are conventionally composed of a self-consuming anode, an insoluble cathode, a depolarizer mixture impregnated with the electrolyte to which conducting material, for instance, carbon black or graphite is added, and a separator between the anode and the depolarizer mixture. Separation of anode and depolarizer mixture (black mix) can be attained in different manner, for instance, by using a cereal paste or a separator layer such as lined paper, cellulose or other organic non-fibrous, film-forming material, as, for instance, methyl cellulose, ethyl cellulose, or their derivatives.

One of the most important properties of a good separator is its low internal resistance. By using an electrolyte-containing cereal paste as outer electrolyte, whereby the outer electrolyte designates the electrolyte paste conventionally positioned between the anode and the cathode of a dry battery, the ion mobility is strongly reduced by the high content of flour or starch (20–25%). Papers provided with different coatings and separators of other known materials have also a relatively high inner resistance so that the load to which cells provided with such separators can be subjected is limited. Furthermore, the cereal pastes or, respectively, other separators shall occupy only as small a part of the cell volume as possible and the manufacturing costs of the separator means shall not noticeably increase the production costs of the primary cells.

All those requirements could not be met by the heretofore known separator means.

It is now one object of the present invention to provide separator means for primary cells which meet the above mentioned requirements, which are of low specific gravity and of highly resistant gel structure and which do not impede the mobility of ions in the electrolyte due to their low inner resistance.

Another object of the present invention is to provide a primary cell composed of a self-consuming anode, an insoluble cathode, a depolarizer mix, and such a highly advantageous separator.

Other objects of the present invention and advantageous features thereof will become apparent as the description proceeds.

The above and other objects and advantages of the present invention are accomplished by providing separator foils of organic polyelectrolyte gels in primary cells. It has been found especially advantageous to cause gel formation by treating the polyelectrolyte solutions with bivalent or multivalent metal cations. Such a treatment renders the resulting gels highly resistant to aging. It is, of course, understood that only such metal cations can be used which exert no harmful side effects in the primary cells.

The foils according to the present invention contain only about 2% of solids. Thus they occupy only a very small part of the cell volume, because about 98% of the foil volume is impregnated with the conventional aqueous salt solutions used as electrolyte in primary cells, for instance, zinc, manganese, or alkaline earth metal salts. The metal cations causing gel formation shall be as electronegative or, respectively, more strongly negative than the negative electrode of the cell in which the gel foil is used. Tests have shown that separators prepared from alginic acid or pectin are especially suitable for the use in primary cells.

The following examples serve to illustrate the present invention without, however, limiting the same thereto.

*Example 1*

An absorptive material, for instance, paper is impregnated with a 10–30% zinc chloride solution. The impregnated layer is placed into a frame of the desired separator size. An about 2% aqueous alginic acid or sodium alginate solution is poured into the frame to cover said absorptive material. The frame prevents spreading of the alginic acid solution so that a foil of the desired size is formed therein. The alginic acid or sodium alginate solidifies to a gel by the action of the zinc cations. The gel layer grows slowly upwardly from the absorptive material. The thickness of the gel layer can be varied within wide limits by the thickness of the alginic acid solution layer and by pouring off the non-gelled alginic acid solution after the required gelling time. The absorptive material with the gel layer is then installed in the primary cell as separator.

According to another embodiment of the present invention the absorptive material with the gel layer is placed into water and the gel layer is separated from the absorptive material. The gel foil without its support can then be used as separator in a primary cell.

*Example 2*

An absorptive material, for instance, is impregnated with a 1–3% aqueous alginic acid or sodium alginate solution. The impregnated sheet is immersed into a 10% aqueous manganous chloride solution. The gel layer formed by the action of the manganese ions together with the absorptive material is used as separator.

The resulting separator foils are especially suitable for cells with acid or neutral electrolytes. The foil is chemically and electrochemically absolutely inert to such electrolytes. Most of the electrolytes of this pH-range contain cations which favor gel formation of the alginic acid or pectin so that weakening of the gel structure cannot take place.

Another advantage of the separator foils according to the present invention is their low specific gravity as compared with that of conventional separators.

In contrast to the heretofore used separators, the new separators hardly impede the ionic mobility in the electrolyte. The inner resistance of a cell with a gel foil separator according to the present invention is considerably lower than that of cells with conventional separators, such as lined paper, cereal paste, carboxy methyl cellulose, and the like.

Thus, it has been found that flat cells containing separator foils of the present invention have an inner resistance which is ten times less than that of flat cells with conventionally lined paper. The short-circuit current of cells with conventional paper separators amounts to 0.2 amp. In contrast thereto the short-circuit current of cells with gel foils according to the present invention amounts to 2.0 amp. The same decrease of the inner resistance was also achieved when using the separators of the present invention in so-called paper-lined cells.

If especially high structural strength is required of the separators in the cells, the gel foil according to the present invention may also be used in combination with an absorptive fibrous material support as explained in the examples.

Example 3

The procedure is the same as described in Example 1, whereby, however, a 2% aqueous pectin solution is used in place of the alginic acid solution. The resulting gel layer with or without its support is employed as separator in primary cells. The gel foil has also a considerably lower inner resistance than conventionally used separators.

Example 4

100 cc. of a 3% aqueous solution of carboxy methyl cellulose of the type "Herkules 9 HP" with a viscosity of 500 cp. is placed in a flat dish and is then mixed with a solution of 0.2 g. of magnesium chloride. Gelling takes place immediately and the gel is removed from the dish after it has attained sufficient strength.

If it is desired to prolong the gelling time, metal salts are used, the cations of which are only slowly released for reaction with the polyelectrolyte. Especially suitable for this purpose has proved the addition of an aqueous suspension of basic aluminum acetate. Varying amounts of basic aluminum acetate caused to react with the polyelectrolyte solution permit to vary the gelling time. Thus when adding a suspension of 0.15 g. of basic aluminum acetate to 100 cc. of a 3% solution of the above mentioned carboxy methyl cellulose, gelling is completed within about 25 minutes. It is, however, necessary that always sufficient amounts of metal ions are available because otherwise no solid gel is formed.

In place of alginic acid and pectin employed in the preceding examples, there may be used other organic polyelectrolytes such as pectic acid, carboxy methyl cellulose of varying chain length, carboxy vinyl polymers as they are sold under the trademark "Carbopol" by B. F. Goodrich Chemical Comp., carubin, guaran, agar, and in general all polyelectrolytes which are gelled by metal cations, provided the gel formation is irreversible under the conditions of use of the cell.

In place of the gelling metal salt solutions employed in the preceding examples, there may be employed other metal salt solutions such as other calcium, zinc, and manganese salts such as calcium chloride, zinc sulfate, managanous chloride, aluminum, strontium, barium salts, and other readily dissociable bivalent and polyvalent metal salts, provided the metals are more electronegative than the metal forming the negative electrode of the cell, which is preferably made of zinc. The preferred gelling salts are those of aluminum, magnesium and alkaline earth metals in addition to those used in the preceding examples.

In place of paper used in the preceding examples as absorptive sheet material, there may be employed various types of textile fabrics such as cotton fabric, polyamide fiber fabric of the "nylon"- and "Perlon"-type, fabrics of other synethic fiber materials provided they are not attacked by the components of the cell or during its operation.

As stated hereinabove, the separator foils according to the present invention may be prepared in any desired size and thickness. They must, of course, be large enough to absorb the amount of electrolyte required for any given cell. The foil may be rather thin because, as stated above, it contains only 2% of solid matter and thus is capable of holding large amounts of electrolyte. Depending upon the type of cell used whether it is a flat cell, a paper-lined cell, or any other type of cell, the thickness of the foil may be between about 0.1 mm. and about 2.0 mm. A thickness between about 0.3 mm. and about 0.6 mm. has proved to be especially suitable.

The separator foils according to the present invention are preferably used immediately after their preparation. Should storing of the gels be required, they are preferably stored in the precipitating solution.

As stated above, the separator foils are installed in primary cells of the round dry-cell type or of the flat cell type and also in cells of the encased leakproof, sealed-in type in which cells it takes the place of the heretofore used cereal pastes or paper separators.

The attached drawing illustrates the use of the new separator foil according to the present invention in a paper-lined cell, i.e. in a cell wherein the electrolyte is absorbed by paper or a similar separator material. The illustrated figure shows a longitudinal cross section through such a cell. Zinc cup 1 serves as anode and container of the cell. Central carbon rod 3 is embedded in black mix 2 which consists of a mixture of manganese dioxide with carbon black or graphite and serves as cathode and depolarizer. They are inserted into zinc cup 1 but are separated therefrom by separator foil 4 consisting of the polyelectrolyte gel according to the present invention and containing the electrolyte. Disk or washer 5 is provided on top of the depolarizer bobbin 2. Said disk consists of paper board or plastic. It serves as support for the spacer cone 6 made of insulating plastic material. Metal cap 7 forms the upper seal of the cell. It is separated and insulated from zinc cup 1 by the upper beaded rim of spacer cone 6. Expansion space 8 is provided to receive electrolyte expanding during discharging. Zinc cup 1 is encased by plastic casing 9 which carries the label. Bottom washer 10 is arranged between zinc cup 1 and bobbin 2.

Of course, many changes and variations in the polyelectrolyte used, in the metal salt employed for gelling, in the concentration of the polyelectrolyte and metal salt solutions, in the manner of producing the gels and of installing them into the primary cells, and the like may be made by those skilled in the art in accordance with the principles set forth herein and in the claims annexed hereto.

We claim:
1. A primary cell comprising a cathode with its depolarizer, and an anode separated therefrom by a separator foil of a gel of a metal salt of pectin, the metal cation being polyvalent and at least as electronegative as the negative electrode of the cell.
2. The primary cell of claim 1 in which the separator foil comprises a fibrous adsorptive sheet impregnated with said gel.
3. The cell of claim 1 in which the metal cation is one of the following: the alkaline earth metals, aluminum or manganese.
4. The cell of claim 1 in which the gel is zinc salt of pectin.
5. The cell of claim 1 in which the foil is impregnated in major proportion with electrolyte.
6. The cell of claim 1 in which the foil is porous.

References Cited

UNITED STATES PATENTS

| | | | |
|---|---|---|---|
| 2,375,650 | 5/1945 | Hegan et al. | 260—209.6 X |
| 2,542,052 | 2/1951 | Owens et al. | 260—209.5 X |
| 3,040,114 | 6/1962 | Huber | 136—103 X |
| 3,092,518 | 6/1963 | Cahoon et al. | 136—146 |

FOREIGN PATENTS

| | | |
|---|---|---|
| 76,243 | 8/1961 | France. |
| 54,494 | 5/1943 | Netherlands. |

WINSTON A. DOUGLAS, *Primary Examiner.*

D. L. WALTON, *Assistant Examiner.*